United States Defensive Publication [19] (H) [11] T959,009

McConnell et al. [43] June 7, 1977

[54] PROCESS FOR POWDERING SEMI-CRYSTALLINE POLYESTER PELLETS

[76] Inventors: Richard Leon McConnell, 421 Manderley Road, Kingsport, Tenn. 37660; Doyle Allen Weemes, 1603 Moore Ave., Greeneville, Tenn. 37743

[21] Appl. No.: 751,787

[22] Filed: Dec. 16, 1976

[51] Int. Cl.[2] ..... C08G 63/74

[52] U.S. Cl. ..... 260/75 T; 260/29.2 E

[57] ABSTRACT

Process for converting semi-crystalline polyester pellets into powder without cryogenically grinding, the polyester pellets being derived from polyester polymers having a melting point of about 80°–140° C. and a $\Delta H_f$ of $\leq 10$, by heating the polyester pellets to a temperature of about 130° C. to about 200° C. in an admixture of about 200 to about 1,000 parts of water based on 100 parts of polymer, of about 15 to about 150 parts of organic solvent selected from aromatic and chlorinated solvents such as toluene, xylene, benzene, chloroform, methylene chloride, and about 5 to about 25 parts of a wetting agent comprising a block copolymer of ethylene oxide and propylene oxide having a molecular weight of about 8,000 to about 13,500; the admixture is cooled to ambient temperature while stirring; then the admixture is filtered to remove the water and the solvent from the resulting polyester powder; and finally the filtered powder is washed to remove the wetting agent.

14 Claims, No Sheets Drawing,

13 Pages Specification

The file of this unexamined application may be inspected and copies thereof may be purchased (849 O.G. 1221, Apr. 9, 1968).